US010764593B2

(12) United States Patent
Choi et al.

(10) Patent No.: US 10,764,593 B2
(45) Date of Patent: Sep. 1, 2020

(54) METHOD AND APPARATUS FOR CODING VIDEO HAVING TEMPORAL SCALABILITY, AND METHOD AND APPARATUS FOR DECODING VIDEO HAVING TEMPORAL SCALABILITY

(71) Applicant: SAMSUNG ELECTRONICS CO., LTD., Suwon-si (KR)

(72) Inventors: Byeong-doo Choi, Siheung-si (KR); Young-o Park, Seoul (KR); Il-koo Kim, Osan-si (KR); Jae-hyun Kim, Seoul (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 14/412,828

(22) PCT Filed: Jul. 3, 2013

(86) PCT No.: PCT/KR2013/005923
§ 371 (c)(1),
(2) Date: Jan. 5, 2015

(87) PCT Pub. No.: WO2014/007550
PCT Pub. Date: Jan. 9, 2014

(65) Prior Publication Data
US 2015/0163500 A1 Jun. 11, 2015

Related U.S. Application Data

(60) Provisional application No. 61/667,654, filed on Jul. 3, 2012.

(51) Int. Cl.
H04N 19/44 (2014.01)
H04N 19/30 (2014.01)
(Continued)

(52) U.S. Cl.
CPC ............. *H04N 19/30* (2014.11); *H04N 19/31* (2014.11); *H04N 19/46* (2014.11);
(Continued)

(58) Field of Classification Search
CPC ........ H04N 19/30; H04N 19/31; H04N 19/46; H04N 19/513; H04N 19/52; H04N 19/70;
(Continued)

(56) References Cited

U.S. PATENT DOCUMENTS 7,916,789 B2   3/2011  Kim et al.
9,113,172 B2 *  8/2015  Hong ..................... H04N 19/70
(Continued)

FOREIGN PATENT DOCUMENTS

CN    1 01 401 433 A    4/2009
CN       102318347 A    1/2012
(Continued)

OTHER PUBLICATIONS

Samuelsson et al: "Temporal layer access pictures and CRA", 7. JCT-VC Meeting; 98. MPEG Meeting; Nov. 21-30, 2011; Geneva; (Joint Collaborative Team on Video Coding of ISO/IEC JTC1/SC29/WG11 and ITU-T SG.16); JCTVC-G584, Nov. 8, 2011 (Nov. 8, 2011), XP030110568.*
(Continued)

Primary Examiner — Jamie J Atala
Assistant Examiner — Patrick E Demosky
(74) Attorney, Agent, or Firm — Sughrue Mion, PLLC

(57) ABSTRACT

Provided are a video encoding method and apparatus having temporal scalability, and a video decoding method and apparatus having temporal scalability. The video encoding method includes: splitting pictures included in a picture sequence into temporal sub-layers; classifying, as a first temporal layer access picture or a second temporal layer access picture, a temporal layer access picture based on (Continued)

whether a picture encoded after the temporal layer access picture is capable of referring to a picture encoded before the temporal layer access picture; and adding, to transmission unit data including the temporal layer access picture, type syntax information for identifying the first temporal layer access picture and the second temporal layer access picture, wherein the picture encoded after the temporal layer access picture belongs to a same temporal sub-layer as the temporal layer access picture or belongs to an upper temporal sub-layer to the temporal layer access picture.

3 Claims, 17 Drawing Sheets

(51) Int. Cl.
| | |
|---|---|
| *H04N 19/31* | (2014.01) |
| *H04N 19/70* | (2014.01) |
| *H04N 19/46* | (2014.01) |
| *H04N 19/513* | (2014.01) |
| *H04N 19/52* | (2014.01) |

(52) U.S. Cl.
CPC ........... *H04N 19/513* (2014.11); *H04N 19/52* (2014.11); *H04N 19/70* (2014.11)

(58) Field of Classification Search
CPC .... H04N 19/169; H04N 19/188; H04N 19/40; H04N 19/44
USPC .......................................................... 348/47
See application file for complete search history.

(56) References Cited

U.S. PATENT DOCUMENTS

| | | | |
|---|---|---|---|
| 9,635,396 B2 | 4/2017 | Wang et al. | |
| 2006/0072661 A1 | 4/2006 | Kim et al. | |
| 2009/0003439 A1* | 1/2009 | Wang .................... | H04N 19/31 375/240.08 |
| 2009/0010331 A1 | 1/2009 | Jeon et al. | |
| 2011/0064146 A1 | 3/2011 | Chen et al. | |
| 2012/0027094 A1 | 2/2012 | Sato et al. | |
| 2012/0183076 A1* | 7/2012 | Boyce ................... | H04N 19/105 375/240.25 |
| 2013/0107953 A1* | 5/2013 | Chen ...................... | H04N 19/70 375/240.12 |
| 2013/0170561 A1* | 7/2013 | Hannuksela ..... | H04N 21/23424 375/240.25 |
| 2013/0272430 A1* | 10/2013 | Sullivan ................. | H04N 19/70 375/240.26 |
| 2013/0279599 A1* | 10/2013 | Wang ............... | H04N 19/00139 375/240.25 |
| 2014/0003520 A1* | 1/2014 | Rodriguez ............. | H04N 19/50 375/240.15 |
| 2015/0023432 A1 | 1/2015 | Choi et al. | |
| 2015/0085938 A1* | 3/2015 | Hendry .................. | H04N 19/70 375/240.25 |
| 2015/0189299 A1* | 7/2015 | Deshpande .......... | H04N 19/503 382/233 |

FOREIGN PATENT DOCUMENTS

| | | |
|---|---|---|
| JP | 2010-507346 A | 3/2010 |
| KR | 10-2006-0051774 A | 5/2006 |
| KR | 10-2008-0081407 A | 9/2008 |
| KR | 10-0908062 B1 | 7/2009 |
| KR | 10-2013-0105214 A | 9/2013 |
| RU | 2 407 217 C2 | 12/2010 |
| WO | 2010/095559 A1 | 8/2010 |
| WO | 2010086501 A1 | 8/2010 |

OTHER PUBLICATIONS

Sullivan et al: "CRA pictures with broken links", 100. MPEG Meeting; Apr. 30, 2012-Apr. 5, 2012; Geneva; (Motion Picture Expert Group or ISO/IEC JTC1/SC29/WG11), No. m24653, May 7, 2012 (May 7, 2012), XP030052996.*

Sullivan et al: "CRA pictures with broken links", 100. MPEG Meeting; Apr. 30, 2013-Apr. 5, 2012; Geneva; (Motion Picture Expert Group or ISO/IEC JTC1/SC29/WG11), May 7, 2012 (May 7, 2012), XP030052996 (Year: 2012).*

Samuelsson et al: "Temporal layer access pictures", Joint Collaborative Team on Video Coding (JCT-VC) of ITU-T SG16 WP3 and ISO/IEC JTC1/SC29/WG11 JCTVC-G584, ITU-T, Nov. 30, 2011, p. 1-5 (Year: 2011).*

Communications dated Oct. 24, 2013 issued by the International Searching Authority in counterpart International Patent Application No. PCT/KR2013/005923 (PCT/ISA/237 and PCT/ISA/210).

Communication dated Apr. 6, 2016, issued by IP Australia in counterpart Australian Application No. 2013285778.

Communication dated Feb. 5, 2016, issued by the European Patent Office in counterpart European Application No. 13812770.9.

Samuelsson J et al: "Temporal layer access pictures and CRA", 7th Meeting: Geneva, CH, Nov. 21-30, 2011. Joint Collaborative Team on Video Coding (JCT-VC) of ITU-T SG16 WP3 and ISO/IEC JTC1/SC29/WG11, Doc : JCTVC-G584, WG11 No. m22149, XP030110568 (5 pages total).

Sullivan (Microsoft) GJ: "CRA pictures with broken links", 9th Meeting: Geneva, CH, Apr. 27-May 7, 2012, Joint Collaborative Team on Video Coding (JCT-VC) of ITU-T SG16 WP 3 and ISO/IEC JTC 1/SC 29/WG 11; Doc: JCTVC-I0404 (rev. 1), XP030052996 (3 pages total).

Deshpande S et al: "On Leading Pictures", 9th Meeting: Geneva, Switzerland, Apr. 27-May 7, 2012, Joint Collaborative Team on Video Coding (JCT-VC) of ITU-T SG16 WP3 and ISO/IEC JTC1/SC29/WG11, Doc: JCTVC-I0275, WG11 No. m24522, XP030112038 (3 pages total).

Deshpande S et al: "Signaling of CRA Pictures", 9th Meeting: Geneva, Switzerland, Apr. 27-May 7, 2012, Joint Collaborative Team on Video Coding (JCT-VC) of ITU-T SG16 WP3 and ISO/IEC JTC1/SC29/WG11, Doc: JCTVC-I0278, WG11 No. m24525, XP030112041 (4 pages total).

TK Tan: "AHG9: Comments and clarification on CRA, BLA, and TFD pictures", 10th Meeting: Stockholm, SE, Jul. 11-20, 2012, Joint Collaborative Team on Video Coding (JCT-VC) of ITU-T SG 16 WP 3 and ISO/IEC JTC 1/SC 29/WG 11, Doc.: JCTVC-J0229, XP030112591 (2 pages total).

Jonatan Samuelsson, et al., "Temporal layer access pictures", Joint Collaborative Team on Video Coding (JCT-VC) of TU-T SG16 WP3 and ISO/IEC JTC1/SC29/WG11 8th meeting: San Jose, CA, USA, Feb. 1-10, 2012, JCTVC-H0566, m23447, ITU-T, total 6 pages.

Communication dated Mar. 7, 2017, issued by the Japanese Patent Office in counterpart Japanese application No. 2015-520062.

Communication dated Oct. 6, 2017, issued by the Indonesian Patent Office in counterpart Indonesian application No. P00201500633.

Communication dated Jun. 15, 2017 by the Russia Federal Service on Intellectual Property in counterpart Russian Patent Application No. 2015103215.

Communication from the Intellectual Property Corporation of Malaysia, dated Mar. 29, 2019 in counterpart application No. PI 2015700004.

Communication dated Mar. 11, 2019, from the Intellectual Property Office of the Philippines in counterpart Application No. 1/2016/500490.

Communication dated Mar. 11, 2019, from the Intellectual Property Office of the Philippines in counterpart Application No. 1/2016/500493.

Communication dated Mar. 11, 2019, from the Intellectual Property Office of the Philippines in counterpart Application No. 1/2016/500491.

Communication dated Mar. 11, 2019, from the Intellectual Property Office of the Philippines in counterpart Application No. 1/2016/500488.

(56) References Cited

OTHER PUBLICATIONS

Communication dated May 2, 2019, from the Intellectual Property Office of the Philippines in counterpart Application No. 1/2016/500023.
Communication dated Dec. 18, 2019, issued by the State Intellectual Property Office of P.R. China in counterpart Chinese Application No. 201810252021.0.
Communication dated Dec. 31, 2019, issued by the State Intellectual Property Office of P.R. China in counterpart Chinese Application No. 201810251772.0.
Communication dated Dec. 18, 2019, issued by the State Intellectual Property Office of P.R. China in counterpart Chinese Application No. 201810251649.9.
Communication dated Dec. 31, 2019, issued by the State Intellectual Property Office of P.R. China in counterpart Chinese Application No. 201810252034.8.
Communication dated Jan. 9, 2018, from the Japanese Patent Office in counterpart application No. 2015-520062.
Communication dated Jan. 23, 2018, from the Russian Patent Office in counterpart application No. 2015103215/08.
Communication dated Jun. 29, 2020 by the Brazilian Patent Office in counterpart Brazilian Patent Application No. BR112015000027-4.

\* cited by examiner

CODING UNIT (1010)

PREDICTION UNIT (1060)

METHOD AND APPARATUS FOR CODING VIDEO HAVING TEMPORAL SCALABILITY, AND METHOD AND APPARATUS FOR DECODING VIDEO HAVING TEMPORAL SCALABILITY

CROSS-REFERENCE TO RELATED APPLICATIONS

This application is a National Stage application under 35 U.S.C. § 371 of PCT/KR2013/005923, filed on Jul. 3, 2013, which claims the benefit of U.S. Provisional Application No. 61/667,654, filed on Jul. 3, 2012, all the disclosures of which are incorporated herein in their entireties by reference.

BACKGROUND

1. Field

Apparatuses and methods consistent with exemplary embodiments relate to encoding and decoding a video, and more particularly, to video encoding and decoding methods and apparatuses having temporal scalability.

2. Description of the Related Art

Video codecs, such as ITU-T H.261, ISO/IEC MPEG-1 visual, ITU-T H.262 (ISO/IEC MPEG-2 visual), ITU-T H.264, ISO/IEC MPEG-4 visual, and ITU-T H.264 (ISO/IEC MPEG-4 AVC), perform prediction encoding on a macroblock via inter prediction or intra prediction, and generate and output a bitstream according to a predetermined format defined by each video codec, by using encoded image data.

According to a related art, a video having temporal scalability is provided by applying a hierarchical B-picture or motion compensated temporal filtering (MCTF).

SUMMARY

According to aspects of one or more exemplary embodiments, video compression efficiency may be increased as a picture encoded after a temporal layer access picture accessed during temporal layer switching may use a picture encoded before the temporal layer access picture as a reference picture.

Furthermore, according to aspects of one or more exemplary embodiments, transmission unit data of a temporal layer access picture and transmission unit data of a picture that is not decodable during temporal layer switching may be distinguished from each other in a network adaptive layer (NAL) unit.

According to an aspect of an exemplary embodiment, a temporal layer access picture is classified by distinguishing when a picture, which is referable by pictures decoded after the temporal layer access picture, is limited and is not limited, and information for identifying the classified temporal layer access picture is added to a transmission data unit.

According to an aspect of an exemplary embodiment, there is provided a video encoding method having temporal scalability, the video encoding method including: splitting pictures included in a picture sequence into temporal sub-layers; classifying, as a first temporal layer access picture or a second temporal layer access picture, a temporal layer access picture based on whether a picture encoded after the temporal layer access picture is capable of referring to a picture encoded before the temporal layer access picture; and adding, to transmission unit data comprising the temporal layer access picture, type syntax information for identifying the first temporal layer access picture and the second temporal layer access picture, wherein the picture encoded after the temporal layer access picture belongs to a same temporal sub-layer as the temporal layer access picture or belongs to an upper temporal sub-layer to the temporal layer access picture.

According to an aspect of another exemplary embodiment, there is provided a video encoding apparatus having temporal scalability, the video encoding apparatus including: a video encoder configured to split pictures included in a picture sequence into temporal sub-layers; and a multiplexer configured to classify, as a first temporal layer access picture or a second temporal layer access picture, a temporal layer access picture based on whether a picture encoded after the temporal layer access picture is capable of referring to a picture encoded before the temporal layer access picture, and configured to add, to transmission unit data comprising the temporal layer access picture, type syntax information for identifying the first temporal layer access picture and the second temporal layer access picture, wherein the picture encoded after the temporal layer access picture belongs to a same temporal sub-layer as the temporal layer access picture or belongs to an upper temporal sub-layer to the temporal layer access picture.

According to an aspect of another exemplary embodiment, there is provided a video decoding method having temporal scalability, the video decoding method including: receiving transmission unit data obtained by splitting and encoding pictures included in a picture sequence into temporal sub-layers; and identifying, by using type syntax information included in the transmission unit data, a temporal layer access picture accessed for temporal layer up-switching from a lower temporal sub-layer to an upper temporal sub-layer, wherein the temporal layer access picture is classified as a first temporal layer access picture or a second temporal layer access picture based on whether a picture decoded after the temporal layer access picture is capable of referring to a picture decoded before the temporal layer access picture, and wherein the picture decoded after the temporal layer access picture belongs to a same temporal sub-layer as the temporal layer access picture or belongs to an upper temporal sub-layer to the temporal layer access picture.

According to an aspect of another exemplary embodiment, there is provided a video decoding apparatus having temporal scalability, the video decoding apparatus including: a receiver configured to receive transmission unit data obtained by splitting and encoding pictures included in a picture sequence into temporal sub-layers; and an inverse multiplexer configured to identify, by using type syntax information included in the transmission unit data, a temporal layer access picture accessed for temporal layer up-switching from a lower temporal sub-layer to an upper temporal sub-layer, wherein the temporal layer access picture is classified as a first temporal layer access picture or a second temporal layer access picture based on whether a picture decoded after the temporal layer access picture is capable of referring to a picture decoded before the temporal layer access picture, and wherein the picture decoded after the temporal layer access picture belongs to a same temporal sub-layer as the temporal layer access picture or belongs to an upper temporal sub-layer to the temporal layer access picture.

According to aspects of one or more exemplary embodiments, an unnecessary process of decoding a picture may be skipped and hardware resources may be saved by identifying and discarding a network adaptive layer (NAL) unit with respect to a picture that is unable to be decoded after a temporal layer access picture. Also, according to aspects of one or more exemplary embodiments, video compression efficiency may be increased as a picture encoded after a temporal layer access picture may use a picture encoded before the temporal layer access picture as a reference picture.

DETAILED DESCRIPTION OF EXEMPLARY EMBODIMENTS

Hereinafter, one or more exemplary embodiments will be described more fully with reference to the accompanying drawings. While describing one or more exemplary embodiments, an image may include a still image or a moving image, and may also be referred to as a video. Also, while describing one or more exemplary embodiments, an image frame may also be referred to as a picture. As used herein, the term "and/or" includes any and all combinations of one or more associated items. Expressions such as "at least one of," when preceding a list of elements, modify the entire list of elements and do not modify the individual elements of the list.

Figure 1:
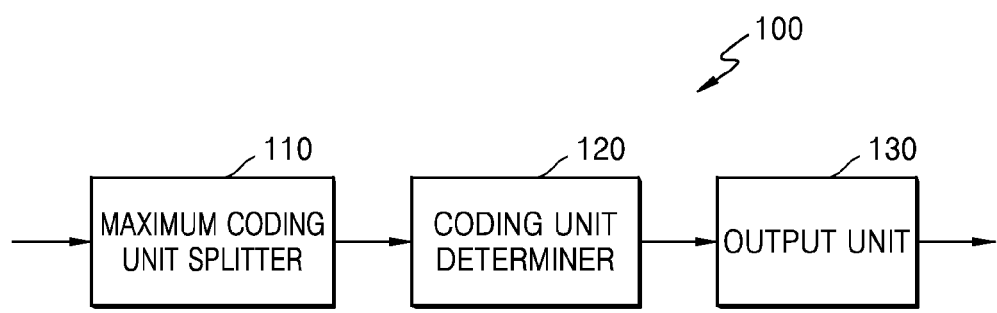
FIG. 1 is a block diagram of a video encoding apparatus according to an exemplary embodiment.

FIG. 1 is a block diagram of a video encoding apparatus 100 according to an exemplary embodiment.

A video encoding apparatus 100 according to an exemplary embodiment includes a maximum coding unit splitter 110, a coding unit determiner 120, and an output unit 130 (e.g., outputter).

The maximum coding unit splitter 110 may split a current picture based on a maximum coding unit that is a coding unit having a maximum size for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, or 256×256, wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit a total number of times a height and a width of the maximum coding unit are hierarchically split may be previously set.

The coding unit determiner 120 encodes at least one split region obtained by splitting a region of the maximum coding unit according to depths, and determines a depth to output final encoding results according to the at least one split region. In other words, the coding unit determiner 120 determines a coded depth by encoding the image data in the deeper coding units according to depths, according to the maximum coding unit of the current picture, and selecting a depth having a least encoding error. The determined coded depth and the image data according to the maximum coding unit are output to the output unit 130.

The image data in the maximum coding unit is encoded based on the deeper coding units corresponding to at least one depth equal to or less than the maximum depth, and encoding results are compared based on each of the deeper coding units. A depth having the least encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Also, even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 according to an exemplary embodiment may determine coding units having a tree structure included in a current maximum coding unit. The 'coding units having a tree structure' according to an exemplary embodiment include coding units corresponding to a depth determined to be a coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of times splitting is performed from a maximum coding unit to a minimum coding unit. A first maximum depth according to an exemplary embodiment may denote a total number of times splitting is performed from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if the minimum coding unit is a coding unit obtained by splitting the maximum coding unit four times, 5 depth levels of depths 0, 1, 2, 3, and 4 exist, and thus the first maximum depth may be set to 4 and the second maximum depth may be set to 5.

Prediction encoding and frequency transformation may be performed according to the maximum coding unit. The prediction encoding and the transformation are also performed based on the deeper coding units according to a depth equal to or depths less than the maximum depth, according to the maximum coding unit.

Since a number of deeper coding units increases whenever the maximum coding unit is split according to depths, encoding including the prediction encoding and the frequency transformation has to be performed on all of the deeper coding units generated as the depth increases. For convenience of description, the prediction encoding and the frequency transformation will now be described based on a coding unit of a current depth, from among at least one maximum coding unit.

The video encoding apparatus 100 according to an exemplary embodiment may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an exemplary embodiment may also perform the frequency transformation on the image data in a coding unit based not only on the coding unit for encoding the image data but also based on a data unit that is different from the coding unit.

In order to perform the frequency transformation in the coding unit, the frequency transformation may be performed based on a data unit having a size smaller than or equal to the coding unit. For example, the data unit for the frequency transformation may include a data unit for an intra mode and a data unit for an inter mode.

A data unit used as a base of the frequency transformation will now be referred to as a 'transformation unit'. Similarly to the coding unit, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and frequency transformation. Accordingly, the coding unit determiner 120 not only determines a coded depth having a least encoding error but also determines a partition type in a prediction unit, a prediction mode according to prediction units, and a size of a transformation unit for frequency transformation.

Coding units having a tree structure in a maximum coding unit and a method of determining a partition according to an exemplary embodiment will be described in detail below with reference to FIGS. 3 through 12.

The coding unit determiner 120 may measure an encoding error of deeper coding units according to depths by using Rate-Distortion (RD) Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit and information about at least one encoding mode is determined for a coding unit of a coded depth, information about at least one encoding mode may be determined for one maximum coding unit. Also, a coded depth of the data of the maximum coding unit may be different according to locations since the data is hierarchically split according to depths, and thus information about the coded depth and the encoding mode may be set for the data.

Accordingly, the output unit 130 according to an exemplary embodiment may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting a lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or group of pictures (GOPs), and information about a maximum depth may be inserted into a header of a bitstream.

The maximum coding unit splitter and the coding unit determiner 120 correspond to a video coding layer (VCL) that determines a reference frame of each image frame forming an image sequence by performing motion prediction and compensation according to coding units with respect to the each image frame of the image sequence, and encode the each image frame by using the determined reference frame.

In the video encoding apparatus 100 according to an exemplary embodiment, the deeper coding unit is a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 according to an exemplary embodiment may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and frequency transformations, an optimum encoding mode may be determined considering image characteristics of the coding unit of various image sizes.

Thus, if an image having high resolution or a large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus according to an exemplary embodiment, image compression efficiency may be increased since a coding unit is adjusted while considering characteristics of an image while increasing a maximum size of a coding unit while considering a size of the image.

Figure 2:
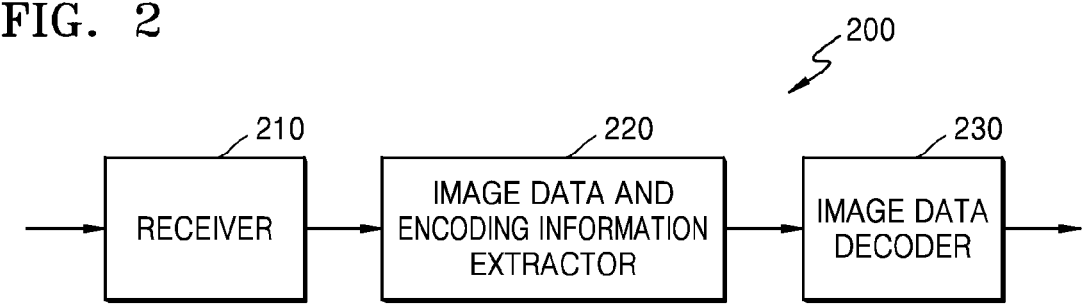
FIG. 2 is a block diagram of a video decoding apparatus according to an exemplary embodiment.

FIG. 2 is a block diagram of a video decoding apparatus 200 according to an exemplary embodiment.

A video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having the tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit corresponding to the coded depth, a prediction mode, and a size of a transformation unit. Also, split information according to depths may be extracted as the information about the coded depth.

The information about the coded depth and the encoding mode according to each maximum coding unit extracted by the image data and encoding information extractor 220 is information about a coded depth and an encoding mode determined to generate a least encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to an encoding mode that generates the least encoding error.

Since encoding information about the coded depth and the encoding mode according to an exemplary embodiment may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse frequency transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse frequency transformation according to each transformation unit in the coding unit, based on the information about the size of the transformation unit of the coding unit according to coded depths, so as to perform the inverse frequency transformation according to maximum coding units.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data of the current depth by using the information about the partition type of the prediction unit, the prediction mode, and the size of the transformation unit for image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 according to an exemplary embodiment may obtain information about a coding unit that generates the least encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored according to a size of a coding unit and an encoding mode, which are adaptively determined according to characteristics of an image, by using information about an optimum encoding mode received from an encoder.

A method of determining coding units having a tree structure, a prediction unit, and a transformation unit according to an exemplary embodiment will now be described with reference to FIGS. 3 through 13.

Figure 3:
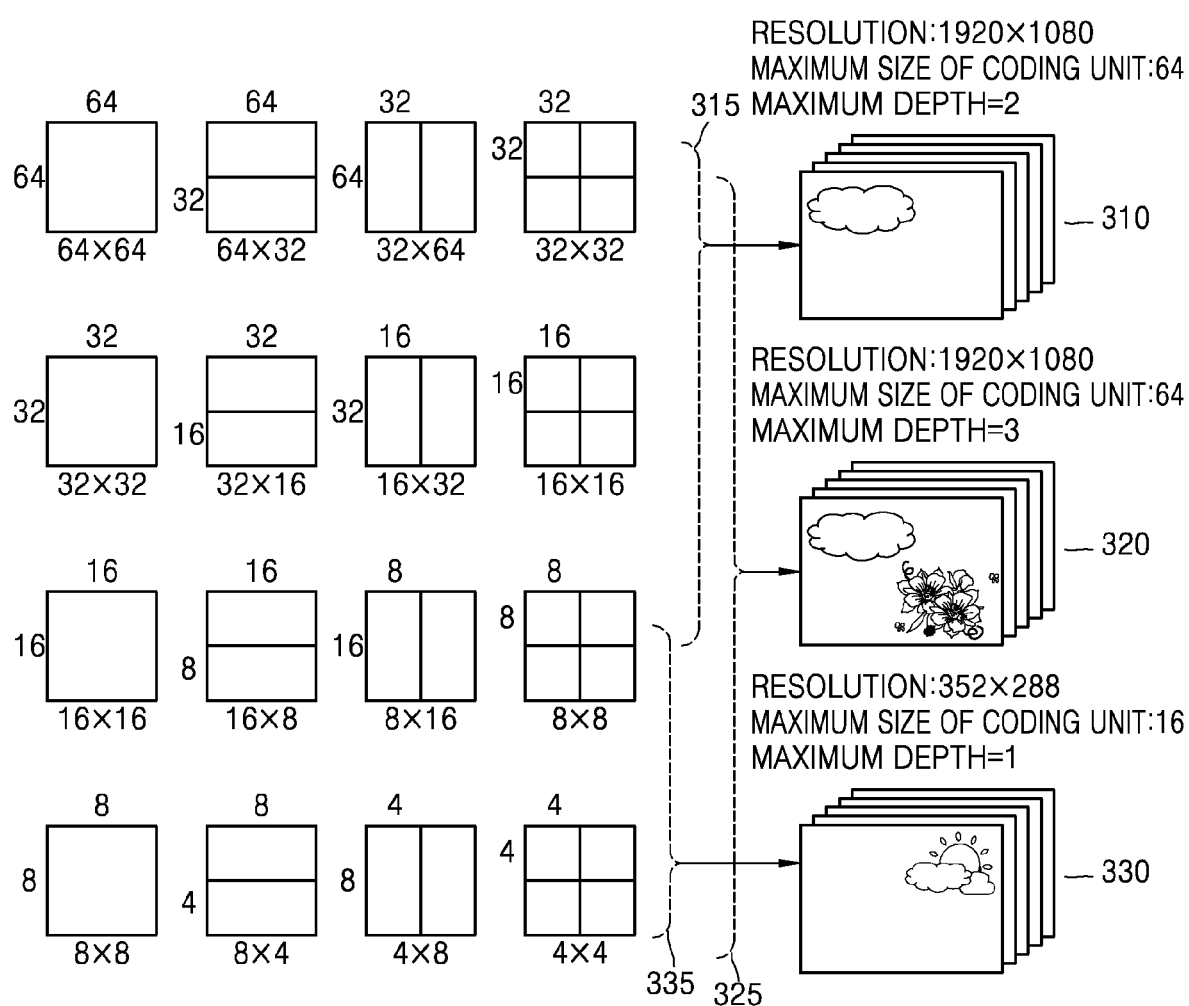
FIG. 3 is a diagram illustrating a concept of coding units according to an exemplary embodiment.

FIG. 3 is a diagram for describing a concept of hierarchical coding units according to an exemplary embodiment.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be more precisely expressed.

Figure 4:
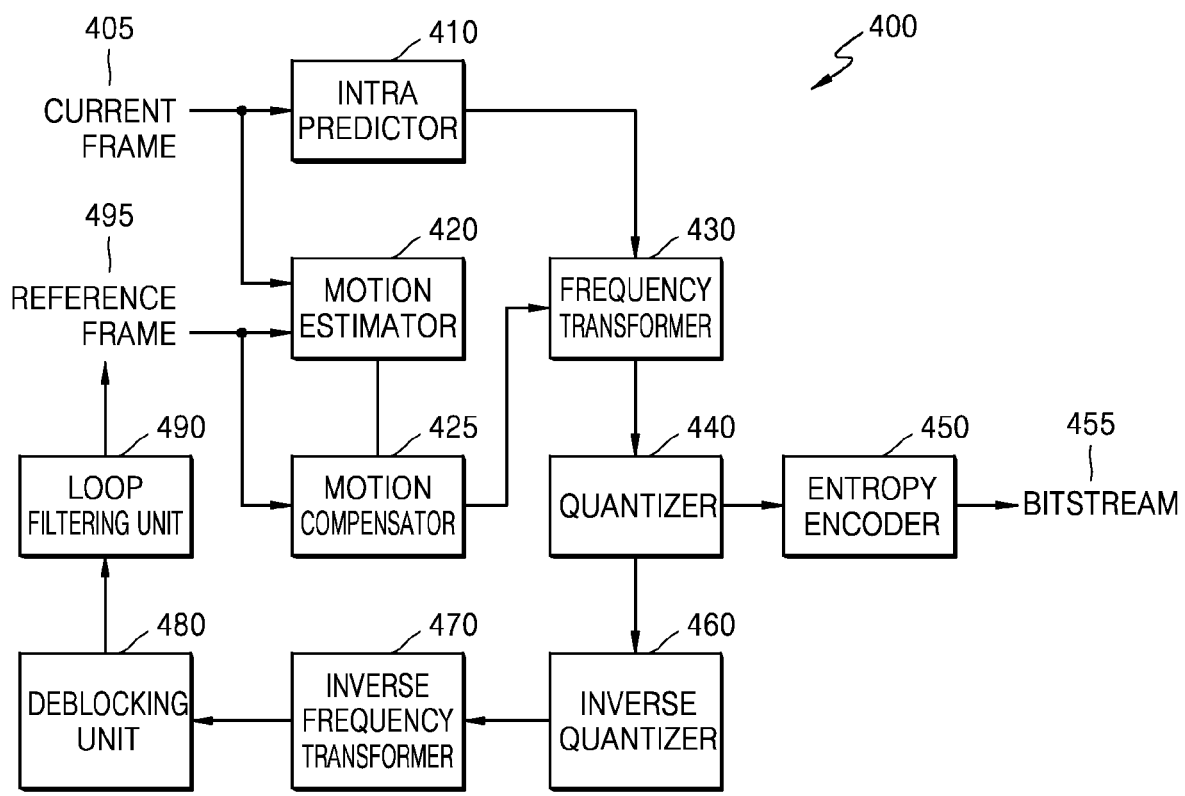
FIG. 4 is a block diagram of an image encoder based on coding units, according to an exemplary embodiment.

FIG. 4 is a block diagram of an image encoder 400 based on coding units, according to an exemplary embodiment.

An image encoder 400 according to an exemplary embodiment performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a frequency transformer 430 and a quantizer 440. The quantized transformation coefficient is restored as data in a spatial domain through an inverse quantizer 460 and an inverse frequency transformer 470, and the restored data in the spatial domain is output as the reference frame 495 after being post-processed through a deblocking unit 480 (e.g., deblocker) and a loop filtering unit 490 (e.g., loop filterer). The quantized transformation coefficient may be output as a bitstream 455 through an entropy encoder 450.

In order for the image encoder 400 to be applied in the video encoding apparatus 100 according to an exemplary embodiment, all elements of the image encoder 400, i.e., the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the loop filtering unit 490 have to perform operations based on each coding unit from among coding units having a tree structure while considering the maximum depth of each maximum coding unit.

Specifically, the intra predictor 410, the motion estimator 420, and the motion compensator 425 have to determine partitions and a prediction mode of each coding unit from among the coding units having the tree structure while considering the maximum size and the maximum depth of a current maximum coding unit, and the frequency transformer 430 has to determine the size of the transformation unit in each coding unit from among the coding units having the tree structure.

Figure 5:
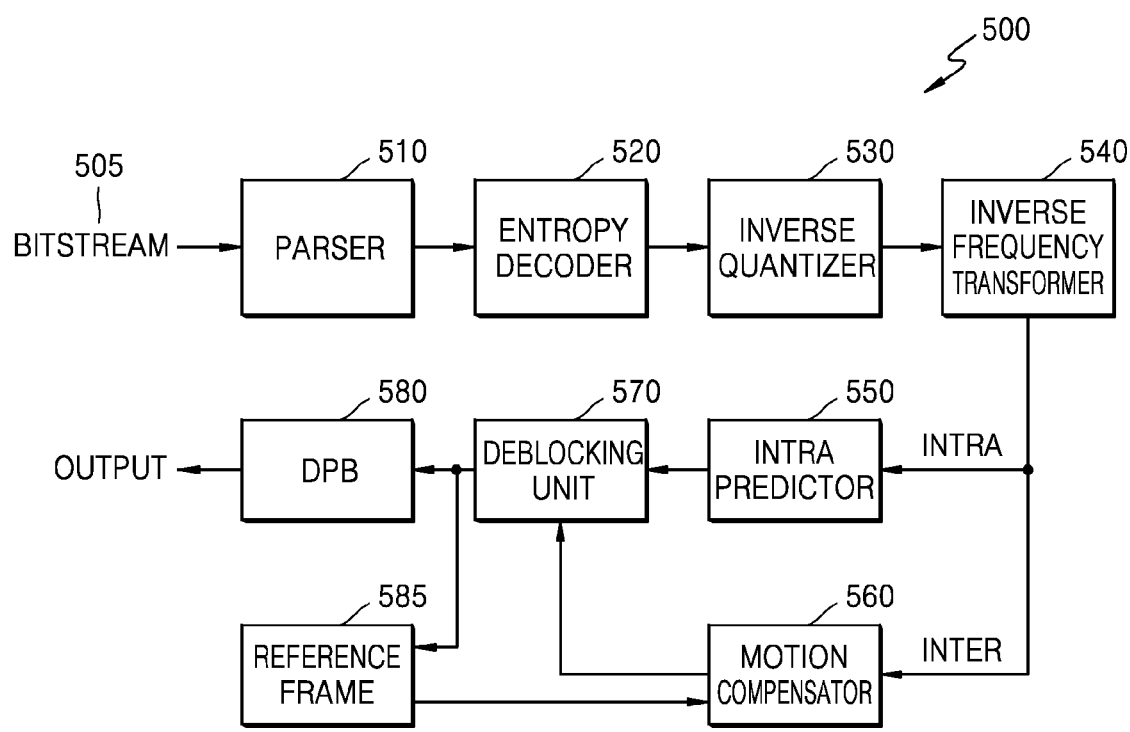
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. In FIG. 5, the parser 510 and an entropy decoder 520 are illustrated as individual components, but obtaining of image data and obtaining of syntax information related to encoded image data, which are performed by the parser 510, may alternatively performed by the entropy decoder 520.

The encoded image data is output as inverse quantized data through the entropy decoder 520 and an inverse quantizer 530, and the inverse quantized data is restored to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585.

Image frame data restored through the intra predictor 550 and the motion compensator 560 may be post-processed through the deblocking unit 570 (e.g., deblocker) and output to a decoded picture buffer (DPB) 580. The DPB 580 stores a decoded image frame so as to store a reference frame, change a display order of image frames, and output an image frame. The DPB 580 stores the decoded image frame and sets a maximum size of a buffer required for normal decoding of an image sequence, by using a maximum decoded frame buffering syntax (max_dec_frame buffering) indicating a maximum buffer size required to normally decode an image frame output from the parser 510 or the entropy decoder 520.

In order to decode the image data in the image data decoder 230 of the video decoding apparatus 200, an image decoder 500 according to an exemplary embodiment may perform operations that are performed after operations of the parser 510 are performed.

In order for the image decoder 500 to be applied in the video decoding apparatus 200 according to an exemplary embodiment, all elements of the image decoder 500, i.e., the parser 510, the entropy decoder 520, the inverse quantizer 530, the inverse frequency transformer 540, the intra predictor 550, the motion compensator 560, and the deblocking unit 570, may perform decoding operations based on coding units having a tree structure for each maximum coding unit. Specifically, the intra predictor 550 and the motion compensator 560 may determine partitions and a prediction mode for each of the coding units having the tree structure, and the inverse frequency transformer 540 may determine a size of a transformation unit for each coding unit.

Figure 6:
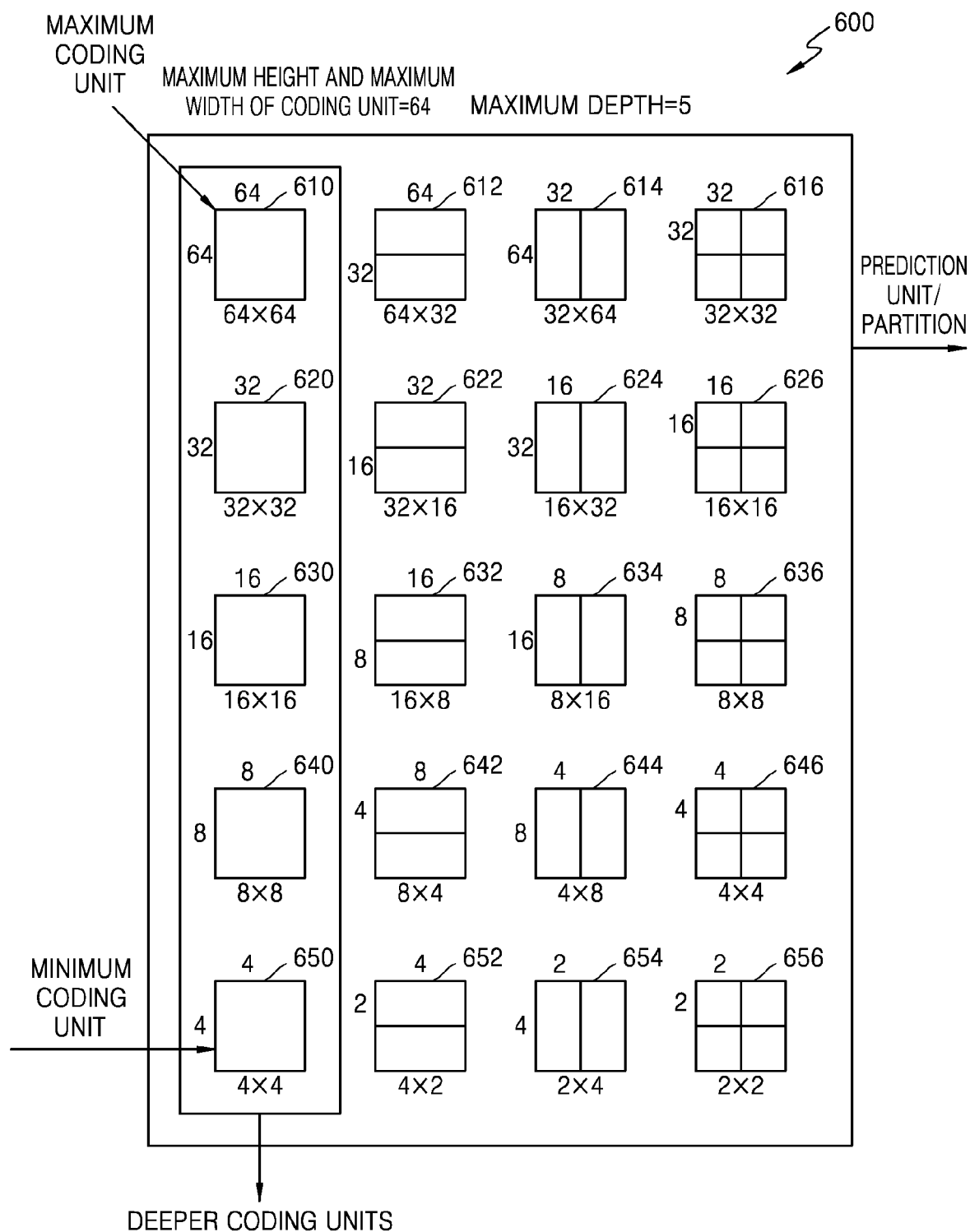
FIG. 6 is a diagram illustrating deeper coding units according to depths, and partitions according to an exemplary embodiment.

FIG. 6 is a diagram illustrating deeper coding units according to depths and partitions, according to an exemplary embodiment.

The video encoding apparatus 100 according to an exemplary embodiment and the video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units according to an exemplary embodiment, the maximum height and the maximum width of the coding units are each 64, and the maximum depth is 4. Since a depth increases along a vertical axis of the hierarchical structure 600 of the coding units according to an exemplary embodiment, a height and a width of the deeper coding unit are each split. Also, a prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

Finally, the coding unit 650 having the size of 4×4 and the depth of 4 is the minimum coding unit and a coding unit of a lowermost depth. A prediction unit of the coding unit 650 is only assigned to a partition having a size of 4×4.

In order to determine a coded depth of the maximum coding unit 610, the coding unit determiner 120 of the video encoding apparatus 100 according to an exemplary embodiment has to perform encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 have to be each encoded.

In order to perform encoding according to each depth, a representative encoding error that is a least encoding error in the corresponding depth may be selected by performing encoding for each prediction unit in the deeper coding units, along the horizontal axis of the hierarchical structure 600 of the coding units. Alternatively, the least encoding error may be searched for by comparing representative encoding errors according to depths by performing encoding for each depth as the depth increases along the vertical axis of the hierarchical structure 600 of the coding units. A depth and a partition having the least encoding error in the maximum coding unit 610 may be selected as the coded depth and a partition type of the maximum coding unit 610.

Figure 7:
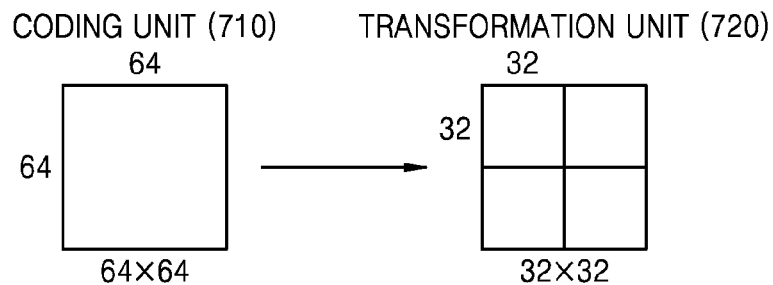
FIG. 7 is a diagram illustrating a relationship between a coding unit and transformation units, according to an exemplary embodiment.

FIG. 7 is a diagram for describing a relationship between a coding unit and transformation units, according to an exemplary embodiment.

The video encoding apparatus 100 according to an exemplary embodiment or the video decoding apparatus 200 according to an exemplary embodiment encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the video encoding apparatus 100 according to an exemplary embodiment or the video decoding apparatus 200 according to an exemplary embodiment, if a size of a current coding unit 710 is 64×64, frequency transformation may be performed by using a transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having a least error may be selected.

Figure 8:
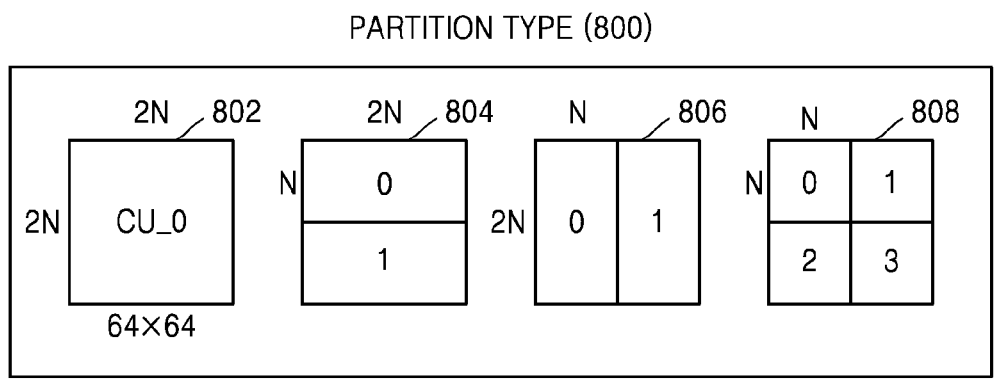
FIG. 8 is a diagram illustrating encoding information of coding units corresponding to a coded depth, according to an exemplary embodiment.
Figure 8:
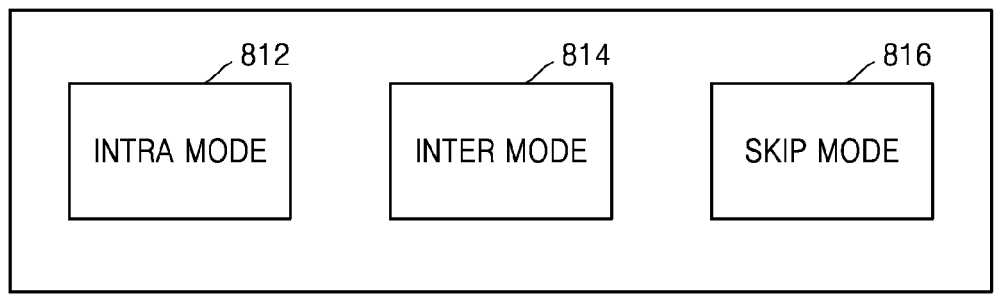
Figure 8:
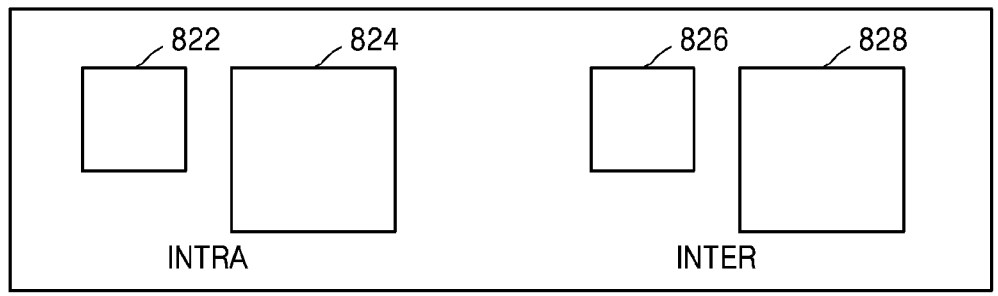

FIG. 8 is a diagram for describing encoding information of coding units corresponding to a coded depth, according to an exemplary embodiment.

The output unit 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800, i.e., an intra mode 812, an inter mode 814, or a skip mode 816.

Also, the information 820 about the size of the transformation unit indicates a transformation unit to be based on when frequency transformation is performed on a current coding unit. For example, the transformation unit may be a first intra transformation unit 822, a second intra transformation unit 824, a first inter transformation unit 826, or a second intra transformation unit 828.

Figure 9:
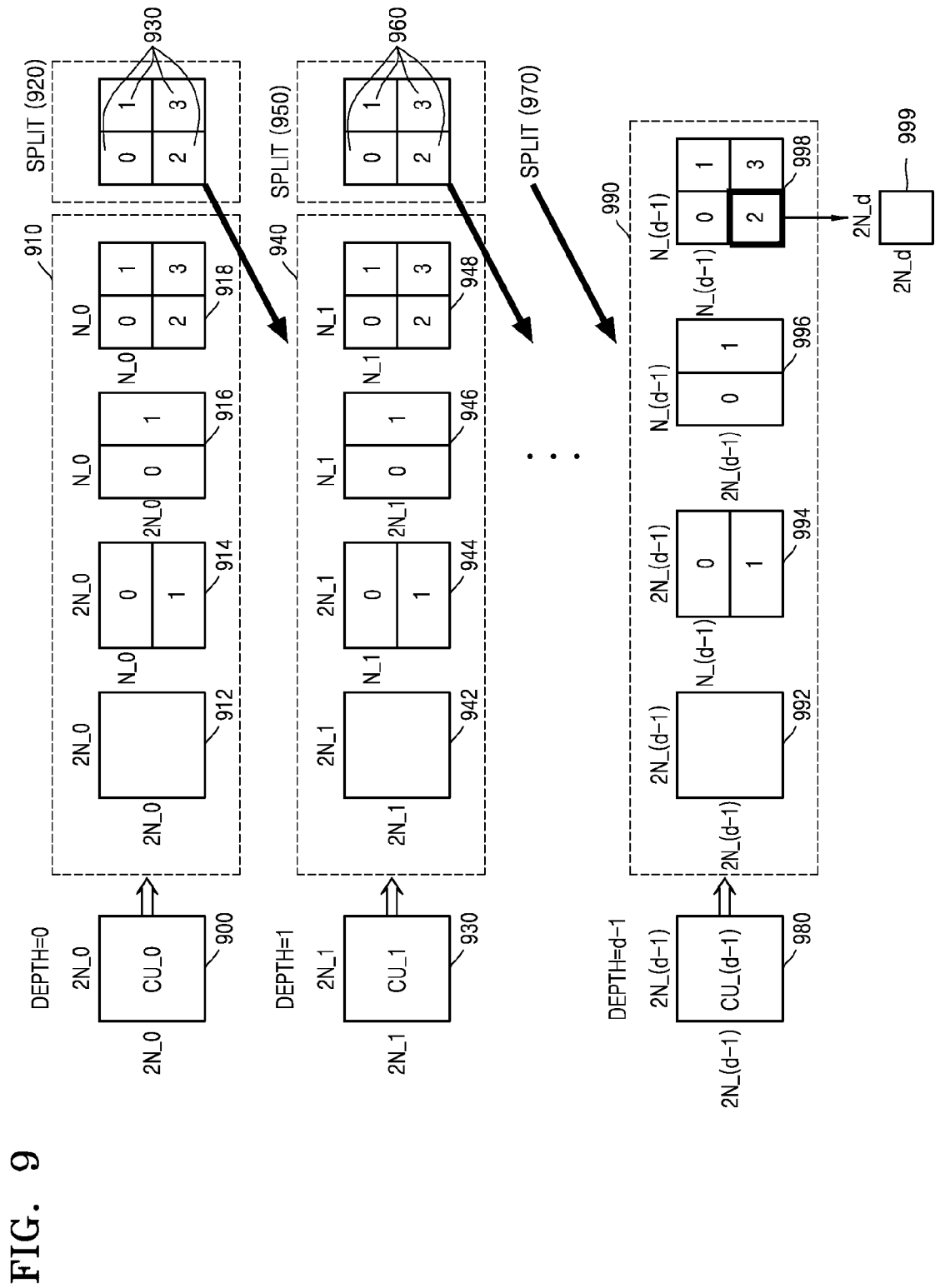
FIG. 9 is a diagram of deeper coding units according to depths, according to an exemplary embodiment.

The image data and encoding information extractor 220 of the video decoding apparatus 200 according to an exemplary embodiment may extract and use the information 800 about the partition type, the information 810 about the prediction mode, and the information 820 about the size of the transformation unit for decoding according to each deeper coding unit FIG. 9 is a diagram of deeper coding units according to depths according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding has to be repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having a size of N_0×N_0, a depth may be changed from 0 to 1 to split the partition type 918 in operation 920, and encoding may be repeatedly performed on coding units 930 having a depth of 2 and a size of N_0×N_0 to search for a least encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a least encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a least encoding error.

Even when the partition type 998 having the size of N_(d−1)×N_(d−1) has the least encoding error, since a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Also, since the maximum depth is d, split information for a coding unit 952 having a depth of d−1 is not set.

A data unit 999 may be referred to as a 'minimum unit' for the current maximum coding unit. A minimum unit according to an exemplary embodiment may be a rectangular data unit obtained by splitting a minimum coding unit having a lowermost coded depth by 4. By performing the encoding repeatedly, the video encoding apparatus 100 may select a depth having a least encoding error by comparing encoding errors according to depths of the coding unit 900 to determine a coded depth, and may set a corresponding partition type and a prediction mode as an encoding mode of the coded depth.

As such, the least encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit has to be split from a depth of 0 to the coded depth, only split information of the coded depth has to be set to 0, and split information of depths excluding the coded depth has to be set to 1.

The image data and encoding information extractor 220 of the video decoding apparatus 200 according to an exemplary embodiment may extract and use the information about the coded depth and the prediction unit of the coding unit 900 to decode the coding unit 912. The video decoding apparatus 200 according to an exemplary embodiment may determine a depth, in which split information is 0, as a coded depth by using split information according to depths, and may use information about an encoding mode of the corresponding depth for decoding.

Figure 10:
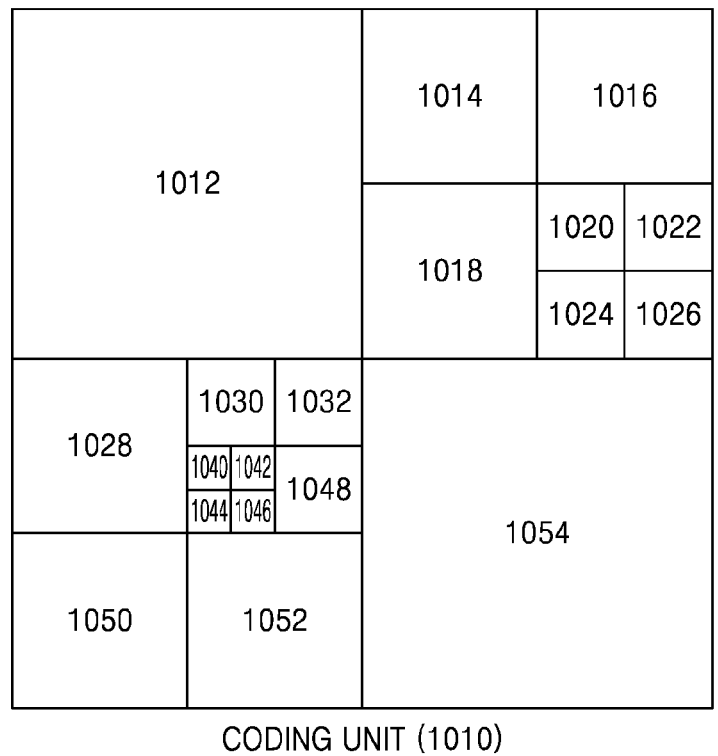
FIGS. 10, 11, and 12 are diagrams illustrating a relationship between coding units, prediction units, and frequency transformation units, according to an exemplary embodiment.
Figure 11:
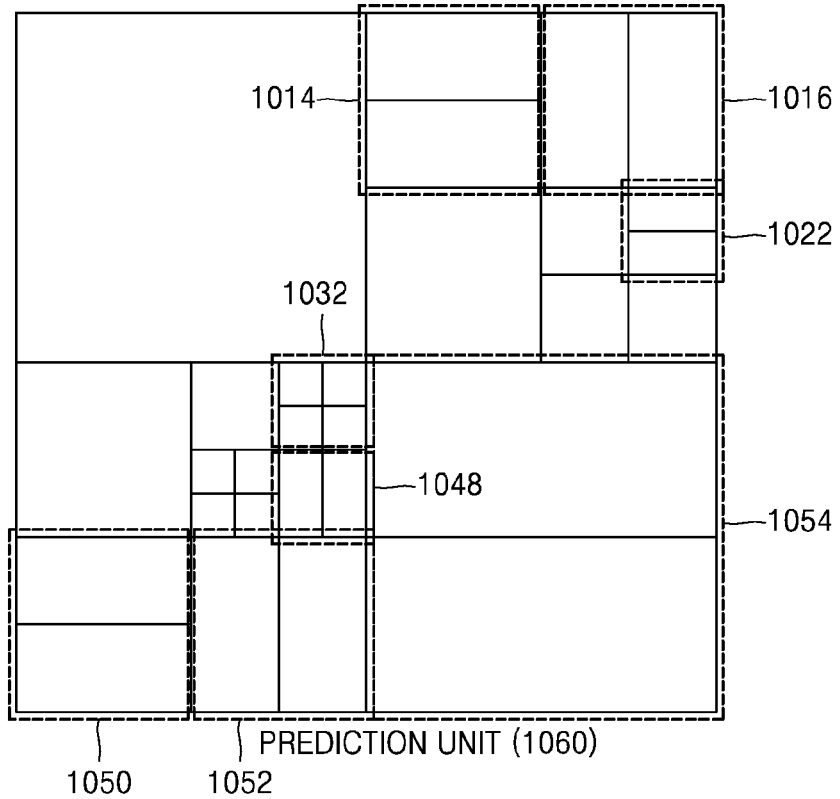
Figure 12:
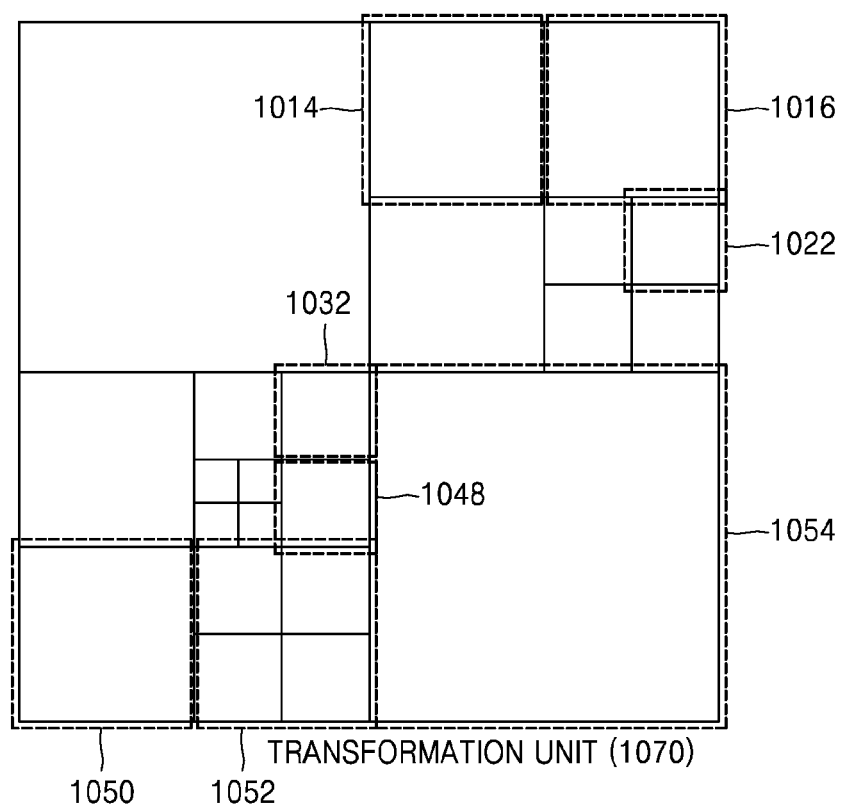

FIGS. 10 through 12 are diagrams for describing a relationship between coding units, prediction units, and frequency transformation units, according to an exemplary embodiment.

Coding units 1010 are coding units corresponding to coded depths determined by the video encoding apparatus 100 according to an exemplary embodiment, in a maximum region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to an exemplary embodiment and the video decoding apparatus 200 according to an exemplary embodiment.

TABLE 1

| | Split Information 0 (Encoding on Coding Unit having Size of 2N × 2N and Current Depth of d) | | | | |
|---|---|---|---|---|---|
| | | | Size of Transformation Unit | | |
| | Partition Type | | Split Information 0 of Transformation Unit | Split Information 1 of Transformation Unit | |
| Prediction Mode | Symmetrical Partition Type | Asymmetrical Partition Type | | | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 | coding unit. Prediction units 1060 are partitions of prediction units of each of the coding units 1010, and transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or inverse frequency transformation is performed on image data of the transformation unit 1052 in the transformation units 1070 in a data unit that is smaller than the transformation unit 1052. Also, the transformation units 1014, 1016, 1022, 1032, 1048, 1050, and 1052 in the transformation units 1070 are different from those in the prediction units 1060 in terms of sizes or shapes. In other words, the video encoding apparatus 100 according to an exemplary embodiment and the video decoding apparatus 200 according to an exemplary embodiment may perform intra prediction/motion estimation/motion compensation, and frequency transformation/inverse frequency transformation individually on a data unit even in the same coding unit.

Accordingly, encoding may be recursively performed on each of coding units having a hierarchical structure in each The output unit 130 of the video encoding apparatus 100 according to an exemplary embodiment may output the encoding information about the coding units having the tree structure, and the image data and encoding information extractor 220 of the video decoding apparatus 200 according to an exemplary embodiment may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

The encoding information about coding units having a tree structure according to an exemplary embodiment may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to adjacent data units, data units adjacent to the current coding unit in deeper coding units may be searched for by using encoded information of the data units, and the searched adjacent coding units may be referred to for prediction encoding the current coding unit.

Figure 13:
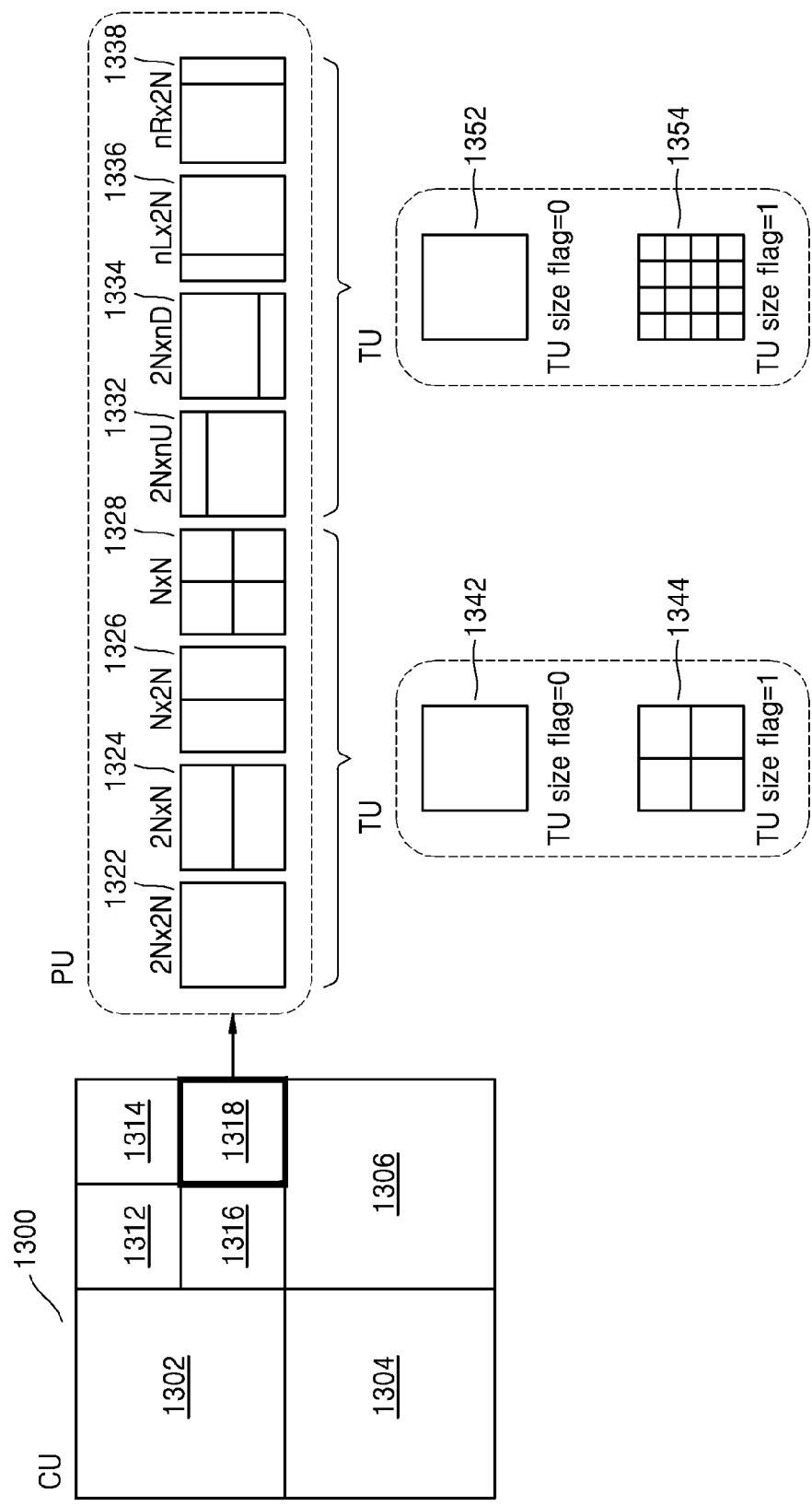
FIG. 13 is a diagram illustrating a relationship between a coding unit, a prediction unit, and a transformation unit, according to encoding mode information of Table 1.

FIG. 13 is a diagram for describing a relationship between a coding unit, a prediction unit, and a transformation unit, according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322 having the size of 2N×2N, 1324 having the size of 2N×N, 1326 having the size of N×2N, or 1328 having the size of N×N, a transformation unit 1342 having a size of 2N×2N may be set if split information (TU size flag) of a transformation unit is 0, and a transformation unit 1344 having a size of N×N may be set if a TU size flag is 1.

When the partition type is set to be asymmetrical, i.e., the partition type 1332 having the size of 2N×nU, 1334 having the size of 2N×nD, 1336 having the size of nL×2N, or 1338 having the size of nR×2N, a transformation unit 1352 having a size of 2N×2N may be set if a TU size flag is 0, and a transformation unit 1354 having a size of N/2×N/2 may be set if a TU size flag is 1.

Figure 14:
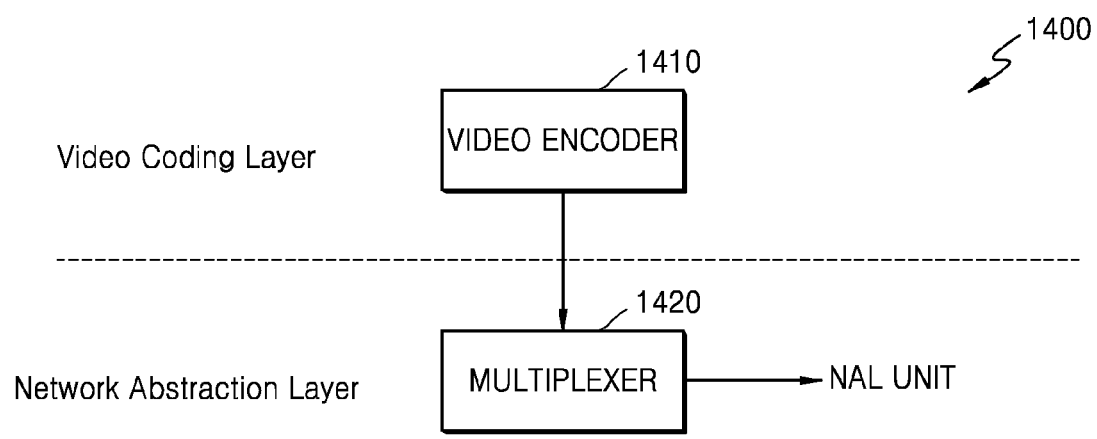
FIG. 14 is a diagram of a video encoding apparatus having temporal scalability, according to an exemplary embodiment.

FIG. 14 is a diagram of a video encoding apparatus 1400 having temporal scalability, according to an exemplary embodiment.

Referring to FIG. 14, a video encoding apparatus 1400 according to an exemplary embodiment includes a video encoder 1410 and a multiplexer 1420.

The video encoder 1410 corresponds to the video encoding apparatus 100 of FIG. 1 described above, and a VCL that handles an encoding process of video data encodes video data based on a hierarchical coding unit as described above. The multiplexer 1420 multiplexes the video data by using a transmission data unit suitable for a protocol or a storage format of a communication channel or a storage media, a video editing system, or a media framework. As will be described below, the multiplexer 1420 may transmit the video data by using a network abstraction layer (NAL) unit that is a transmission unit in an NAL.

In order to provide video data having temporal scalability, the video encoder 1410 may split pictures included in a picture sequence into temporal sub-layers. A temporal sub-layer denotes a group of NAL units including pictures having same temporal identifiers (temporal_id) or information about such pictures.

The multiplexer 1420 may classify a temporal layer access picture as a first temporal layer access picture or a second temporal layer access picture based on whether a picture, which is encoded after the temporal layer access picture and belongs to a same or upper temporal sub-layer as or than the temporal layer access picture, is capable of referring to a picture encoded before the temporal layer access picture, and add type syntax information for identifying the first temporal layer access picture and the second temporal layer access picture to transmission unit data including the temporal layer access picture. A decoding order and an encoding order denote an order in which pictures are processed, respectively by a decoder and an encoder, and the encoding order may be the same as the decoding order. Thus, while describing exemplary embodiments, the encoding order may denote a decoding order and vice versa.

The temporal layer access picture is a picture that is initially encoded (or decoded) after up-switching by being included in an upper temporal sub-layer accessed if switching occurs from a lower temporal sub-layer to the upper temporal sub-layer. As will be described below, the temporal layer access picture is a picture that refers to an available picture at least when the up-switching occurs. The first temporal layer access picture denotes a temporal layer access picture wherein the picture that is encoded after the temporal layer access picture and belongs to the same or upper temporal sub-layer as or than the temporal layer access picture is capable of referring to the picture encoded before the temporal layer access picture. The second temporal layer access picture denotes a temporal layer access picture wherein the picture, which is encoded after the temporal layer access picture and belongs to the same or upper temporal sub-layer as or than the temporal layer access picture, is not capable of referring to the picture encoded before the temporal layer access picture.

Figure 15:
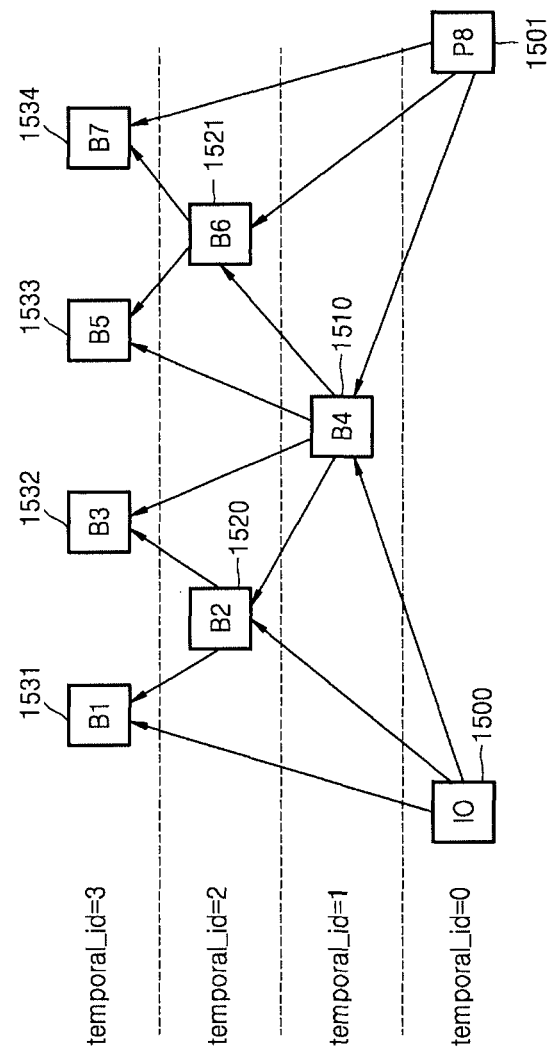
FIG. 15 is a diagram of pictures included in a picture sequence, which are split into temporal sub-layers, according to an exemplary embodiment.
Figure 16:
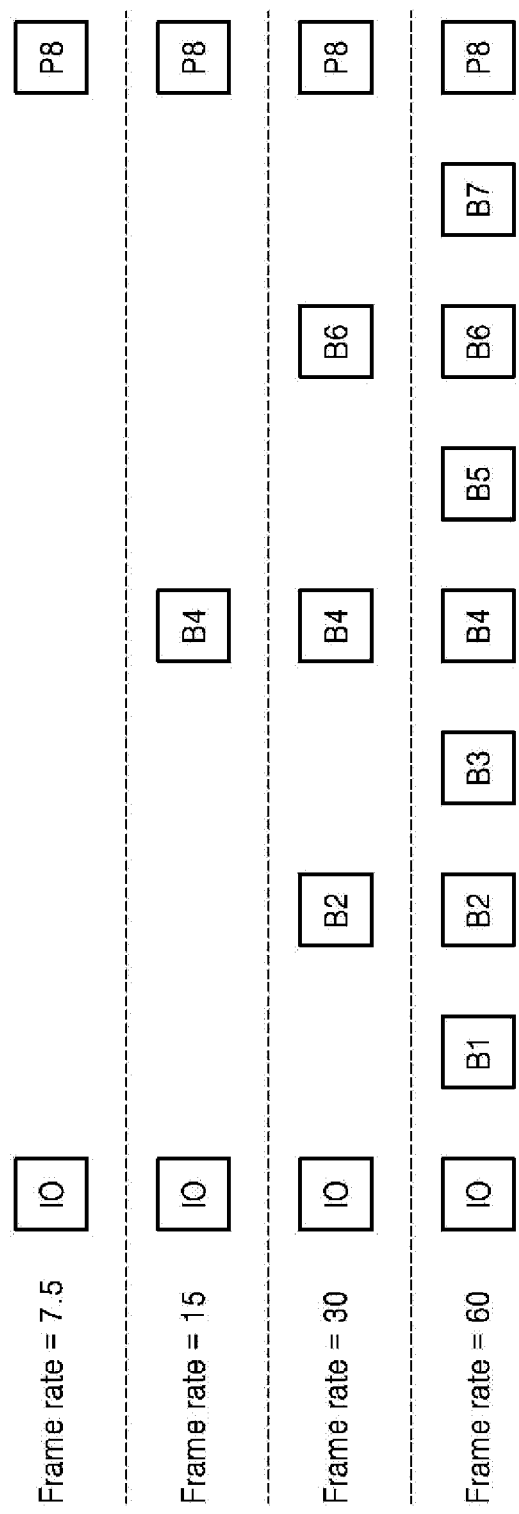
FIG. 16 is a diagram of pictures displayed according to a frame rate, according to an exemplary embodiment.

FIG. 15 is a diagram of pictures included in a picture sequence, which are split into temporal sub-layers, according to an exemplary embodiment. In FIGS. 15 and 16, I, B, and P respectively denote an I-picture, a B-picture, and a P-picture, and a number after I, B, or P denotes a number in a display order. In FIG. 15, a direction of an arrow denotes a reference direction. For example, an I0 picture 1500 is used as a reference picture of a B1 picture 1531.

Referring to FIG. 15, the video encoder 1410 may provide video data having temporal scalability by classifying I0 through B7 pictures 1500 through 1534 included in picture sequences into temporal sub-layers and assigning temporal_id to the pictures 10 through B7 pictures 1500 through 1534 included in each temporal sub-layer.

In detail, values of temporal_id of the I0 picture 1500 and the P8 picture 1501 that belong to a lowermost temporal sub-layer are set to 0. The B4 picture 1510 belongs to a temporal sub-layer having temporal_id of 1. The B2 picture 1520 and the B6 picture 1521 belong to a temporal sub-layer having temporal_id of 2. The B1 picture 1531, the B3 picture 1532, the B5 picture 1533, and the B7 picture 1534 belong to a temporal sub-layer having temporal_id of 3.

FIG. 16 is a diagram of pictures displayed according to a frame rate, according to an exemplary embodiment.

Referring to FIGS. 15 and 16, when a frame rate is 7.5 Hz, an I0 picture and a P8 picture at a lowermost temporal sub-layer and having temporal_id of 0 are displayed. When a frame rate is 15 Hz, a B4 picture having temporal_id of 1 is displayed as well as the I0 and P8 pictures having temporal_id of 0. When a frame rate is 30 Hz, the I0 picture, a B2 picture, the B4 picture, a B6 picture, and the P8 picture having temporal_id of 0, 1, and 2 are displayed. When a frame rate is 60 Hz, the I0 picture, a B1 picture, the B2 picture, a B3 picture, the B4 picture, a B5 picture, the B6 picture, a B7 picture, and the P8 picture having temporal_id of 0, 1, 2, and 4 are displayed.

As such, temporal scalability may be realized by decoding all pictures having temporal_id that is lower than or equal to a predetermined value according to a frame rate, and displaying the decoded pictures. In other words, temporal scalability may be realized by decoding and displaying pictures included in all temporal sub-layers lower than or equal to an upper temporal sub-layer having temporal_id of a predetermined value according to a frame rate.

A change of a frame rate may be defined as temporal layer switching. A change from a low frame rate to a high frame rate is defined as temporal layer up-switching, and a change from a high frame rate to a low frame rate is defined as a temporal layer down-switching. Since temporal layer down-switching may be performed by removing pictures having temporal_id higher than a predetermined value, the temporal layer down-switching may be performed at any time. For example, referring back to FIG. 16, when a frame rate changes from 30 Hz to 7.5 Hz, temporal layer down-switching may be performed by selecting and displaying only the 10 picture and the P8 picture by excluding pictures having temporal_id equal to or higher than 1, i.e., the B2 picture, the B4 picture, and the B6 picture, from among the I0 picture, the B2 picture, the B4 picture, the B6 picture, and the P8 picture having temporal_id of 0, 1, and 2.

On the other hand, temporal layer up-switching is not always possible. For example, if a picture that belongs to an upper temporal sub-layer refers to a further upper picture that is not available during up-switching, the picture that belongs to the upper temporal sub-layer is not decodable. It is assumed that temporal layer up-switching is generated from a temporal sub-layer having temporal_id of 0 to an upper temporal sub-layer having temporal_id of 1. If a picture that belongs to the upper temporal sub-layer having temporal_id of 1 refers to a picture that belongs to a further upper temporal sub-layer having temporal_id of at least 2 as a reference picture, temporal sub-layer up-switching is unable to be performed.

Accordingly, a picture that refers to a picture available at least during temporal layer up-switching from among pictures that belong to an upper temporal sub-layer should be used as a temporal layer access picture.

In order to improve prediction efficiency of a picture that is encoded (or decoded) after the temporal layer access picture, a picture that is encoded after the temporal layer access picture and belongs to the same or upper temporal sub-layer as or than the temporal layer access picture may refer to a picture that is encoded before the temporal layer access picture. Here, prediction efficiency of an image may be increased by expanding reference possibilities since it is more likely that a reference picture similar to a picture to be encoded may be used if a number of candidates available as reference pictures increases. A temporal layer access picture that allows such reference is defined as the first temporal layer access picture. In other words, the first temporal layer access picture is a temporal layer access picture that allows the picture, which is encoded after the temporal layer access picture and belongs to the same or upper temporal sub-layer as or than the temporal layer access picture, to refer to the picture that is encoded before the temporal layer access picture. On the other hand, a temporal layer access picture that restrict such reference is defined as the second temporal layer access picture. In other words, the second temporal layer access picture is a temporal layer access picture that does not allow the picture, which is encoded after the temporal layer access picture and belongs to the same or upper temporal sub-layer as or than the temporal layer access picture, to refer to the picture that is encoded before the temporal layer access picture.

Figure 17:
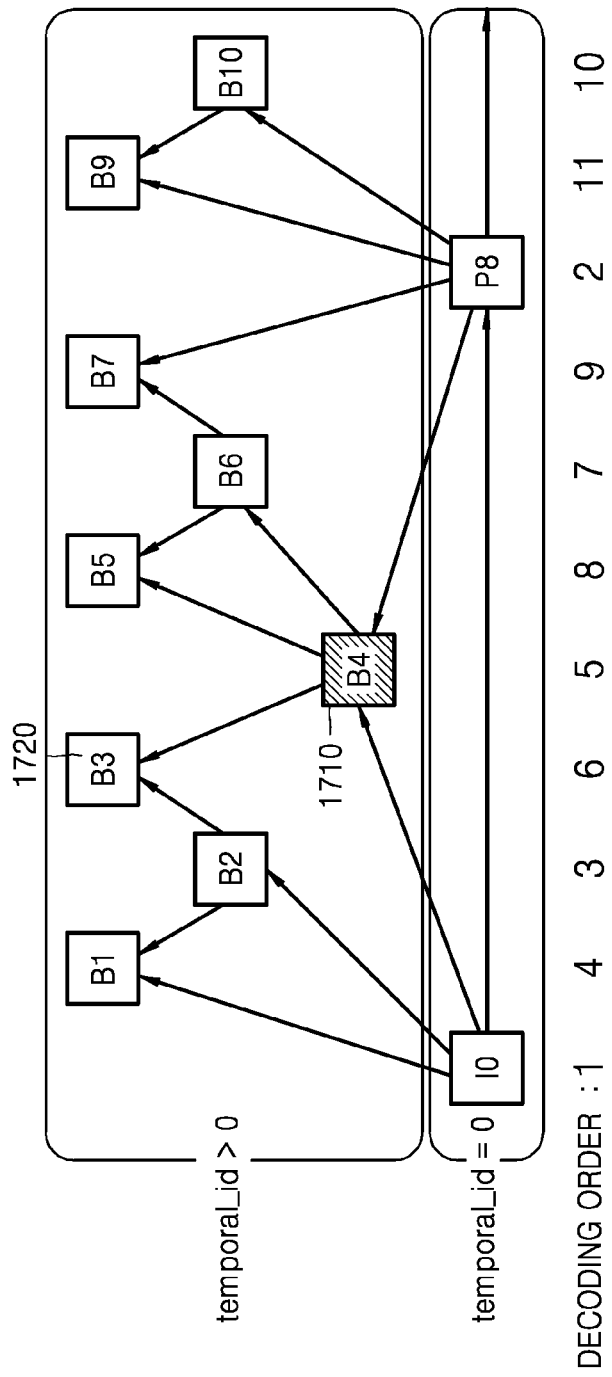
FIG. 17 is a diagram for describing a leading picture and a first temporal layer access, according to an exemplary embodiment.

FIG. 17 is a diagram for describing a leading picture and the first temporal layer access, according to an exemplary embodiment. As described above, I, B, and P respectively denote an I-picture, a B-picture, and a P-picture, and a number after I, B, and P denotes a number in a display order. Also, a direction of an arrow denotes a reference direction.

The leading picture of a predetermined picture denotes a picture that is decoded after the predetermined picture but displayed before the predetermined picture. Referring to FIG. 17, a B3 picture 1720 is a leading picture that is displayed before a B4 picture 1710 but decoded after the B4 picture 1710. Here, it is assumed that the B3 picture 1720 is bi-directionally predicted by referring to a B2 picture as well as the B4 picture 1710. The B4 picture 1710 may be classified as the first temporal layer access picture since the B3 picture 1720 that belongs to the same or upper temporal sub-layer and decoded after the B4 picture 1710 according to a decoding order refers to the B2 picture that is decoded before the B4 picture 1710.

As described above, a number of pictures available as a reference picture may be increased in order to increase prediction efficiency of an image, but in the case of the first temporal layer access picture, a picture that is not further needed during a decoding process may be decoded according to a reference relationship between pictures during temporal layer up-switching.

Figure 18:
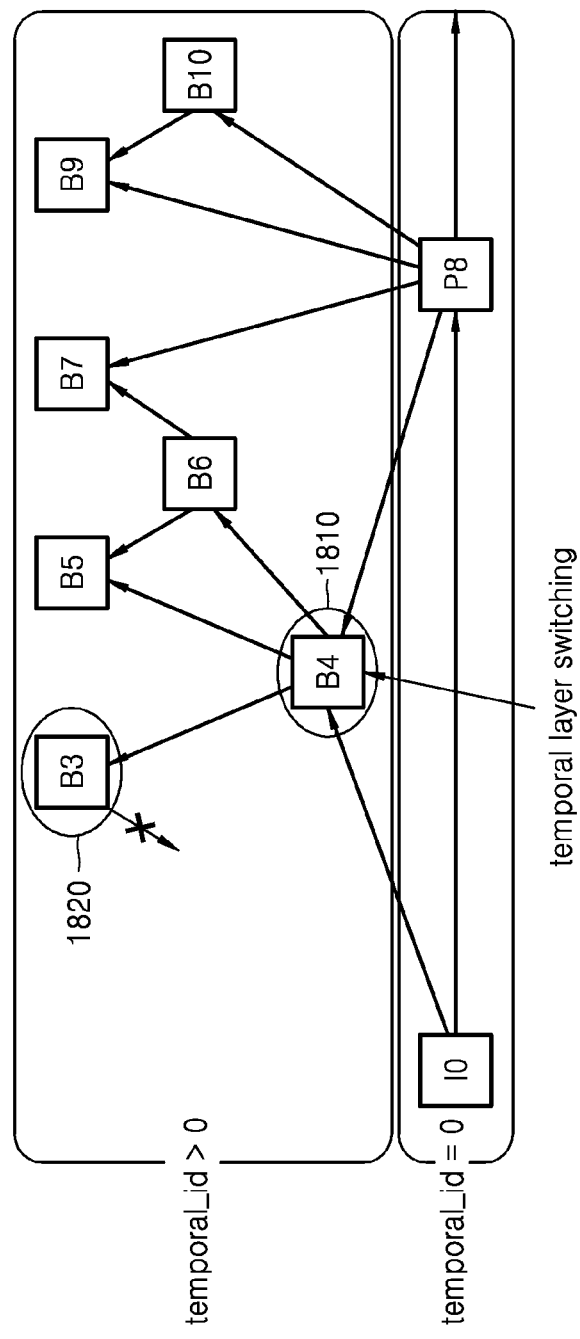
FIG. 18 is a diagram for describing a leading picture that is unable to be decoded during temporal layer up-switching, according to an exemplary embodiment.

FIG. 18 is a diagram for describing a leading picture that is unable to be decoded during temporal layer up-switching, according to an exemplary embodiment.

Referring to FIG. 18, it is assumed that a B4 picture 1810 is a temporal layer access picture if temporal layer up-switching is performed from a lowermost temporal sub-layer to an immediately upper temporal sub-layer. Also, it is assumed that the B4 picture 1810 is the first temporal layer access picture, wherein a picture that is decoded after the B4 picture 1810 and belongs the same or upper temporal sub-layer as or than the B4 picture 1810 is capable of referring to a picture that is decoded before the B4 picture

1810. If the temporal layer up-switching is performed, a B3 picture 1820 that is a leading picture of the B4 picture 1810 is unable to be decoded since there is no reference picture. As such, in the case of the first temporal layer access picture, since a picture that is decoded later is not restricted to refer to a picture that is decoded before the first temporal layer access picture, there may be a leading picture that is unable to be decoded later according to a reference relationship between pictures.

The multiplexer 1420 of the video encoding apparatus 1400 according to an exemplary embodiment may separately classify a picture, which is unable to be decoded during temporal layer up-switching regarding a relationship with the first temporal layer access picture, as a discardable picture and may set a predetermined syntax 'nal_unit_type' to a header of an NAL unit to indicate the discardable picture. For example, the B3 picture 1820 of FIG. 18 may be classified as a discardable picture during temporal layer up-switching.

The picture that is unable to be decoded during the temporal layer up-switching is classified as the discardable picture so that, if a decoding apparatus receives an NAL unit including a discardable picture, hardware resources may be saved by skipping a separate decoding process.

The multiplexer 1420 adds, to a header of an NAL unit including the first temporal layer access picture, first type syntax information (nal_unit_type) indicating that the first temporal layer access picture is included, and adds, to a header of the transmission unit data including the second temporal layer access picture, second type syntax information (nal_unit_type) indicating that the second temporal layer access picture is included.

Figure 19:
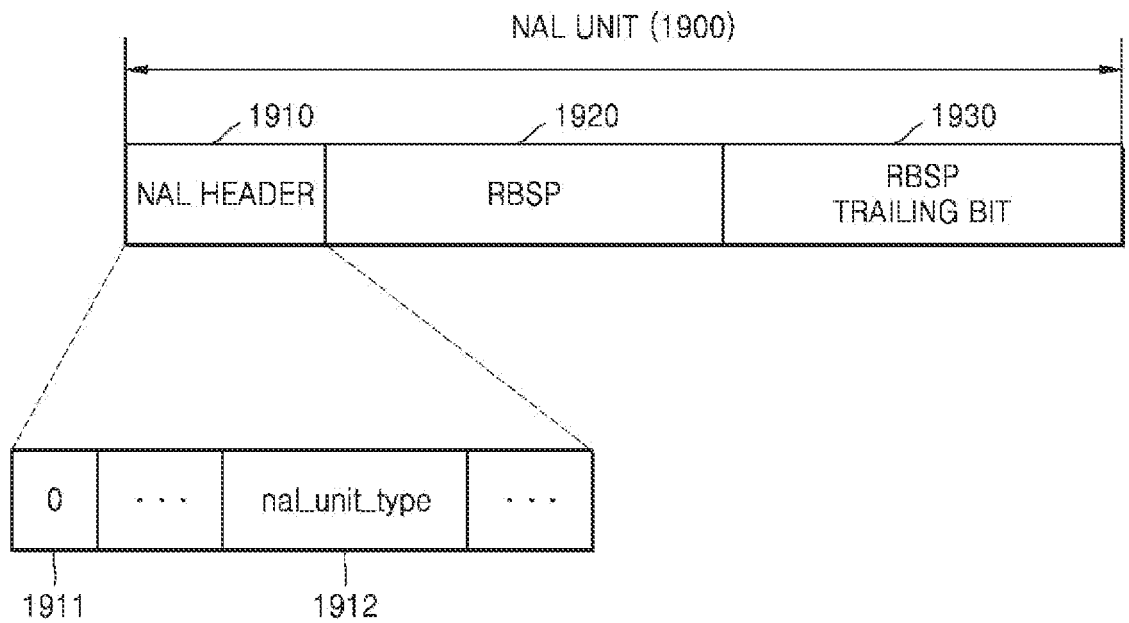
FIG. 19 is a diagram of a network adaptive layer (NAL) unit according to an exemplary embodiment.

FIG. 19 is a diagram of an NAL unit according to an exemplary embodiment.

Referring to FIG. 19, an NAL unit 1900 includes an NAL header 1910 and a raw byte sequence payload (RBSP) 1920. An RBSP trailing bit 1930 is a length adjusting bit added behind the RBSP 1920 so as to express a length of the RBSP 1920 in multiples of 8 bits. The RBSP trailing bit 1930 may start from '1' and then include consecutive '0's determined based on the length of the RBSP 1920 so as to have a pattern such as '100 . . . ', and by searching for '1' that is an initial bit value, the last bit location of the RBSP 1920 immediately before the '1' may be determined.

Syntax 'nal_unit_type' 1912 for identifying whether the first temporal layer access picture, the second temporal layer access picture, and the discardable picture are included in the NAL unit 1900 may be set to the NAL header 1910, as well as syntax 'forbidden_zero_bit' 1911 having a value of 0. In other words, an NAL unit having intrinsic syntax 'nal_unit_type' for transmitting the first temporal layer access picture, the second temporal layer access picture, and the discardable picture may be used.

Table 2 below shows examples of the NAL unit 1900 according to a value of syntax 'nal_unit_type'.

TABLE 2

| nal_unit_type | Content of NAL unit and RBSP syntax structure | NAL unit type class |
|---|---|---|
| 0 | Unspecified | non-VCL |
| 1 | Coded slice of a non-RAP, non-TFD and non-TLA picture slice_layer_rbsp( ) | VCL |
| 2 | Coded slice of a TFD picture slice_layer_rbsp( ) | VCL |

TABLE 2-continued

| nal_unit_type | Content of NAL unit and RBSP syntax structure | NAL unit type class |
|---|---|---|
| 3 | Coded slice of a non-TFD TLA picture slice_layer_rbsp( ) | VCL |
| 4, 5 | Coded slice of a CRA picture slice_layer_rbsp( ) | VCL |
| 6, 7 | Coded slice of a BLA picture slice_layer_rbsp( ) | VCL |
| 8 | Coded slice of an IDR picture slice_layer_rbsp( ) | VCL |
| 9, 10 | Coded slice of a BLT picture slice_layer_rbsp( ) | VCL |
| 11 to 24 | Reserved | n/a |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Supplemental enhancement information (SEI) sei_rbsp( ) | non-VCL |
| 32 to 47 | Reserved | n/a |
| 48 to 63 | Unspecified | non-VCL |

Referring to Table 2, when temporal layer access pictures according to an exemplary embodiment are broken link temporal layer access (BLT) pictures, each of the first and second temporal layer access pictures may be inserted into and transmitted with NAL units in which values of syntax 'nal_unit_type' are 6 and 7.

Also, when a discardable picture is a tagged for discard (TFD) picture, the discardable picture may be inserted into and transmitted with an NAL unit in which a value of syntax 'nal_unit_type' is 2.

Figure 20:
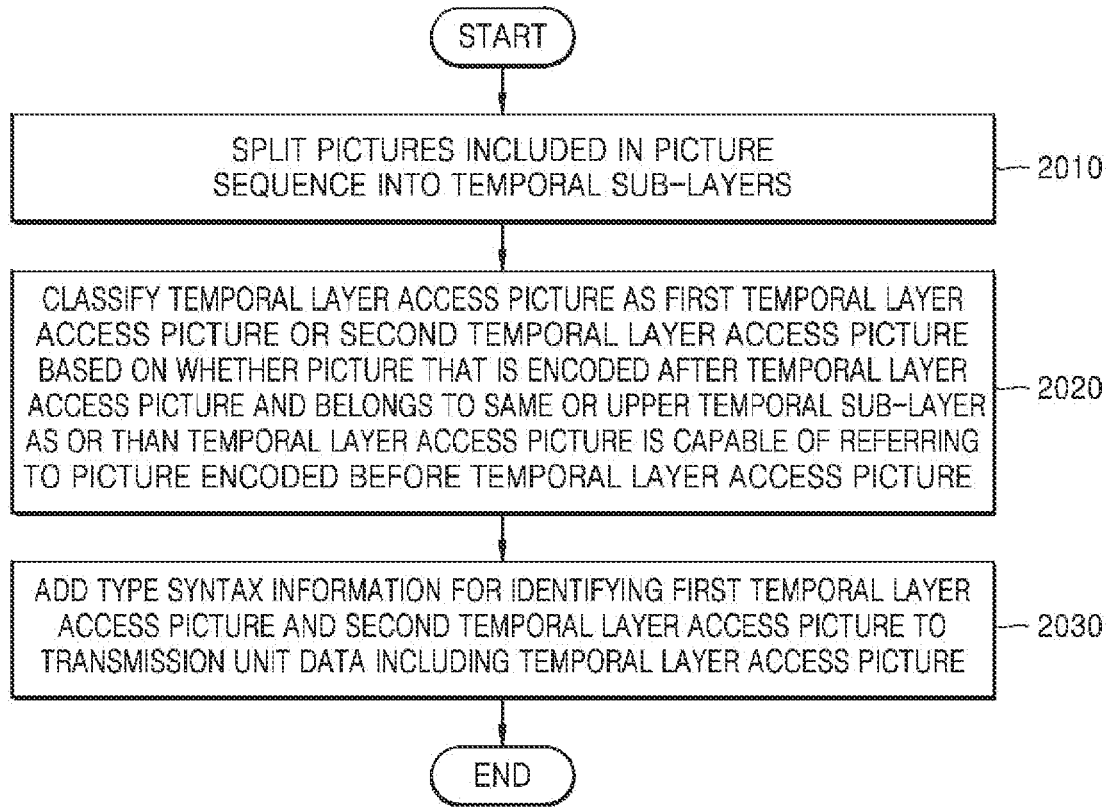
FIG. 20 is a flowchart illustrating a video encoding method having temporal scalability, according to an exemplary embodiment.

FIG. 20 is a flowchart illustrating a video encoding method having temporal scalability, according to an exemplary embodiment.

Referring to FIG. 20, in operation 2010, the video encoder 1410 encodes pictures included in a picture sequence, and splits and outputs the encoded pictures into temporal sub-layers.

In operation 2020, the multiplexer 1420 classifies a temporal layer access picture as a first temporal layer access picture or a second temporal layer access picture based on whether a picture, which is encoded after the temporal layer access picture and belongs to a same or upper temporal sub-layer as or than the temporal layer access picture, is capable of referring to a picture encoded before the temporal layer access picture. As described above, the first temporal layer access picture denotes a temporal layer access picture that allows the picture, which is encoded after the temporal layer access picture and belongs to the same or upper temporal sub-layer as or than the temporal layer access picture, to refer to the picture encoded before the temporal layer access picture. The second temporal layer access picture denotes a temporal layer access picture that does not allow the picture, which is encoded after the temporal layer access picture and belongs to the same or upper temporal sub-layer as or than the temporal layer access picture, to refer to the picture encoded before the temporal layer access picture.

In operation 2030, the multiplexer 1420 adds type syntax information for identifying the first temporal layer access picture and the second temporal layer access picture to transmission unit data including the temporal layer access picture. As described above, the multiplexer 1420 may use an NAL unit that has intrinsic syntax 'nal_unit_type' for transmitting the first temporal layer access picture, the second temporal layer access picture, and a discardable picture.

Figure 21:
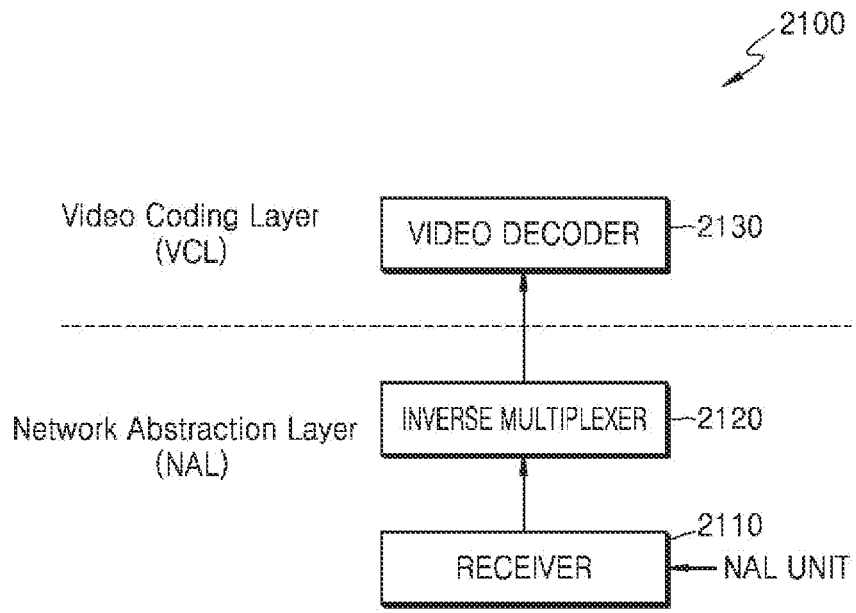
FIG. 21 is a diagram of a video decoding apparatus having temporal scalability, according to exemplary embodiment.

FIG. 21 is a diagram of a video decoding apparatus having temporal scalability, according to exemplary embodiment.

Referring to FIG. 21, a video decoding apparatus 2100 according to an exemplary embodiment includes a video decoder 2130, an inverse multiplexer 2120, and a receiver 2110.

The receiver 2110 receives transmission unit data, i.e., NAL unit data, from the video encoding apparatus 1400 of FIG. 14.

The inverse multiplexer 2120 may determine a type of a picture included in the transmission unit data by using an identifier included in the transmission unit data. As described above, the inverse multiplexer 2120 may determine the NAL unit including the first temporal layer access picture, the second temporal layer access picture, and the discardable picture based on the syntax 'nal_unit_type'.

The video decoder 2130 corresponds to the video decoding apparatus 200 of FIG. 2 or the image decoder 500 of FIG. 5, and decodes a received picture by obtaining split information, information about a partition type, information about a prediction mode, information about a size of a transformation unit, and information about a parameter set related to an encoding process with respect to coding units used to generate image data and encoded data.

Figure 22:
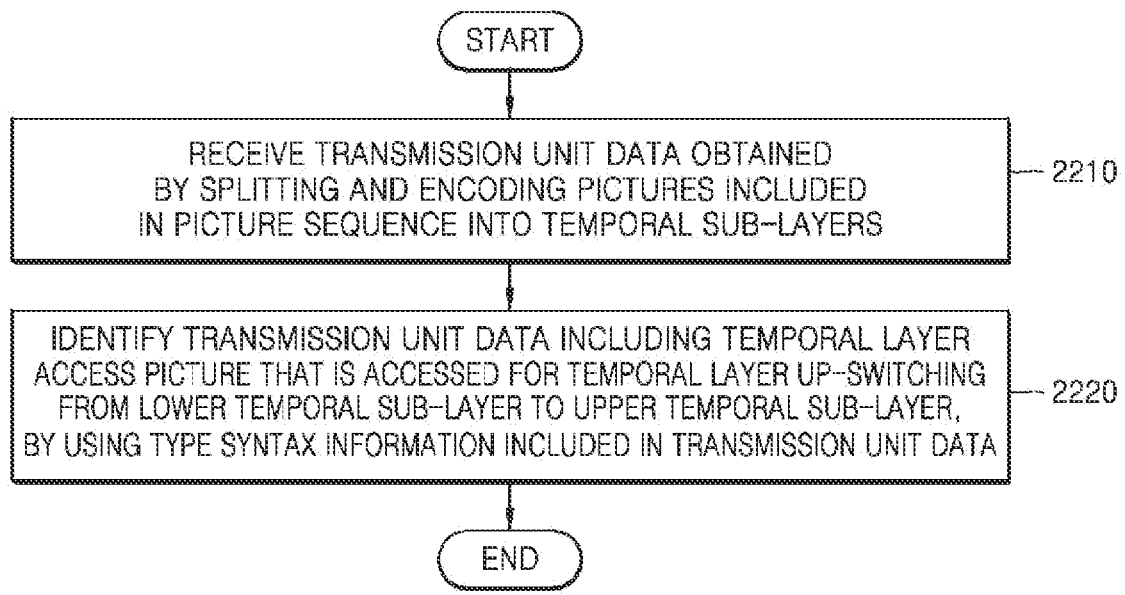
FIG. 22 is a flowchart illustrating a video decoding method having temporal scalability, according to an exemplary embodiment.

FIG. 22 is a flowchart illustrating a video decoding method having temporal scalability, according to an exemplary embodiment.

Referring to FIG. 22, in operation 2210, the receiver 2110 receives transmission unit data obtained by splitting and encoding pictures included in a picture sequence into temporal sub-layers.

In operation 2220, the inverse multiplexer 2120 identifies the transmission unit data including a temporal layer access picture that is accessed for temporal layer up-switching from a lower temporal sub-layer to an upper temporal sub-layer, by using type syntax information included in the transmission unit data.

One or more exemplary embodiments may be written as computer programs and may be implemented in general-use digital computers that execute the programs by using a computer-readable recording medium. Examples of the computer-readable recording medium include magnetic storage media (e.g., a read-only memory (ROM), a floppy disc, and a hard disc), optically readable media (e.g., a compact disc-read only memory (CD-ROM) and a digital versatile disc (DVD)), and carrier waves (such as data transmission through the Internet). Furthermore, it is understood that one or more of the above-described components, elements, units, etc., may be implemented as hardware (e.g., as at least one of one or more processors, a memory, circuitry, etc.) or software (e.g., implemented by at least one processor), or a combination of hardware and software.

While exemplary embodiments been particularly shown and described above, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description but by the appended claims, and all differences within the scope will be construed as being included in the present invention.

The invention claimed is:

1. A video decoding method for decoding video having temporal scalability, the video decoding method comprising:
   receiving transmission unit data obtained by splitting and encoding pictures included in a picture sequence into temporal sub-layers; and
   identifying, by using type syntax information included in the transmission unit data, a type of a temporal layer access picture, wherein the temporal layer access picture being accessed for temporal layer up-switching from a lower temporal sub-layer to an upper temporal sub-layer and being initially decoded after up-switching,
   wherein the type syntax information indicates whether the temporal layer access picture is a first temporal layer access picture or a second temporal layer access picture,
   wherein, when the type syntax information indicates the type of the temporal layer access picture is the first temporal layer access picture, the first temporal layer access picture allows a first picture, which is decoded after the first temporal layer access picture, displayed later than the first temporal layer access picture and belongs to a first temporal sub-layer higher than a second temporal sub-layer in which the first temporal layer access picture is included, to refer to a second picture decoded before the first temporal layer access picture, and
   when the type syntax information indicates the type of the temporal layer access picture is the second temporal layer access picture, the second temporal layer access picture restricts a third picture, which is decoded after the second temporal layer access picture, displayed later than the first temporal layer access picture and belongs to a third temporal sub-layer higher than a third temporal sub-layer in which the second temporal layer access picture is included, from referring to a picture decoded before the second temporal layer access picture.

2. The video decoding method of claim 1, wherein the transmission unit data is data in a network adaptive layer (NAL) unit.

3. The video decoding method of claim 2, wherein the type syntax information is an identifier indicating a type of the NAL unit.

* * * * *